United States Patent [19]
Zimmerman et al.

[11] Patent Number: 5,758,064
[45] Date of Patent: May 26, 1998

[54] METHOD OF DIAGNOSING COMMUNICATION PROBLEMS OF ELECTRONIC PRICE LABELS

[75] Inventors: Terry L. Zimmerman, Lawrenceville; John C. Goodwin, III, Suwanee; Christopher M. Haynes, Doraville, all of Ga.

[73] Assignee: NCR Corporation, Dayton, Ohio

[21] Appl. No.: 622,484

[22] Filed: Mar. 26, 1996

[51] Int. Cl.⁶ .............................. H04Q 1/00; G06F 15/24
[52] U.S. Cl. ........................ 395/183.19; 340/825.54; 235/383
[58] Field of Search ................ 395/183.19, 214; 235/383, 385; 340/825.35, 825.17, 825.54, 825.49; 455/67.7; 364/574

[56] References Cited

U.S. PATENT DOCUMENTS

| | | | |
|---|---|---|---|
| 4,139,149 | 2/1979 | Crepeau et al. | 235/383 |
| 4,766,295 | 8/1988 | Davis et al. | 235/383 |
| 4,954,836 | 9/1990 | Sakuma | 342/450 |
| 4,985,857 | 1/1991 | Bajpai et al. | 364/551.01 |
| 5,172,314 | 12/1992 | Poland et al. | 395/201 |
| 5,245,534 | 9/1993 | Waterhouse et al. | 395/228 |
| 5,295,153 | 3/1994 | Gudmundson | 370/335 |
| 5,309,448 | 5/1994 | Bouloutas et al. | 395/183.01 |
| 5,374,815 | 12/1994 | Waterhouse et al. | 235/383 |
| 5,396,224 | 3/1995 | Dukes et al. | 340/825.49 |
| 5,404,661 | 4/1995 | Sahm et al. | 37/348 |
| 5,528,232 | 6/1996 | Verma et al. | 340/825.54 |
| 5,532,465 | 7/1996 | Waterhouse et al. | 235/383 |
| 5,548,597 | 8/1996 | Kayama et al. | 371/25.1 |

*Primary Examiner*—Robert W. Beausoliel
*Assistant Examiner*—Ly V. Hua
*Attorney, Agent, or Firm*—Paul W. Martin

[57] ABSTRACT

A method of diagnosing communication problems of electronic price labels in a transaction establishment which identifies the probable locations of the problems. The method includes the steps of assigning the electronic price labels to groups based upon their ability to receive a message from a computer, locating the electronic price labels, mapping locations of the electronic price labels, identifying a predetermined group of electronic price labels having the reception problems, and determining the cause of the reception problems.

24 Claims, 7 Drawing Sheets

METHOD OF DIAGNOSING COMMUNICATION PROBLEMS OF ELECTRONIC PRICE LABELS

CROSS-REFERENCE TO RELATED APPLICATIONS

The present invention is related to commonly assigned and co-pending U.S. application entitled, "Method Of Locating Electronic Price Labels In Transaction Establishments", filed Oct. 5, 1995, invented by Goodwin, and having a Ser. No. 08/539,450.

BACKGROUND OF THE INVENTION

The present invention relates to electronic price label (EPL) systems used in transaction establishments, and more specifically to a method of diagnosing communication problems of electronic price labels.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency transmitters to transmit acknowledgment signals acknowledging receipt of messages and to relay acknowledgment signals from other EPLs to receiving devices coupled to a main EPL computer. An EPL only sends an acknowledgment if the message is addressed to it.

EPLs typically differ on their ability to effectively receive and respond to messages from the central server. The primary causes for this difference are the location of EPLs within a transaction establishment and individual design differences among EPLs. Some EPLs may be located in areas of poor reception, where signals are attenuated more than in other areas.

Therefore, it would be desirable to provide a method of diagnosing communication problems of EPLs. It would also be desirable to assign EPLs to groups based upon their ability to receive and transmit messages and to locate EPLs within each of the groups to determine the source of a reception problem.

SUMMARY OF THE INVENTION

In accordance with the teachings of the present invention a method of diagnosing communication problems of electronic price labels is provided.

The method includes the steps of assigning the electronic price labels to groups based upon their ability to receive a message from a computer, locating the electronic price labels, mapping locations of the electronic price labels, identifying a predetermined group of electronic price labels having the reception problems, and determining the cause of the reception problems.

A method of assigning electronic price labels to groups includes the steps of transmitting a number of messages to each electronic price label, transmitting return messages by a number of the electronic price labels, receiving the return messages, determining a signal-to-noise ratio for each of the return messages, establishing a plurality of groups based upon a plurality of signal-to-noise ratio thresholds, determining a highest signal-to-noise ratio threshold for each electronic price label, and assigning each electronic price label to a group corresponding to its highest signal-to-noise ratio threshold.

The highest signal threshold is determined by the steps of determining a number of times the return messages from an electronic price label exceeds a highest signal-to-noise ratio threshold, and if the number exceeds a predetermined pass rate, then assigning the electronic price label to the group corresponding to the highest signal-to-noise ratio threshold. If the number is less than the predetermined pass rate for the highest signal-to-noise ratio threshold, then the method further includes the steps of determining a number of times the return messages from an electronic price label exceed each signal-to-noise ratio threshold below the highest signal-to-noise ratio threshold until the number exceeds one of the signal-to-noise ratio thresholds below the highest signal characteristic threshold, and assigning the electronic price label to the group corresponding to the one signal-to-noise ratio threshold.

A method of locating electronic price labels includes the substeps of mapping locations of receiving antennae within the transaction establishment to a map, transmitting a number of messages to each electronic price label, transmitting return messages by a number of the electronic price labels, receiving the return messages by a number of receiving antennae, determining signal characteristics of the number of return messages at the number of receiving antennae, and determining locations of the number of electronic price labels relative to the locations of the number of receiving antennae from the map from the signal characteristics.

It is accordingly an object of the present invention to provide a method of diagnosing communication problems of electronic price labels.

It is another object of the present invention to provide a method of diagnosing communication problems of groups of electronic price labels.

It is another object of the present invention to provide a method of assigning electronic price labels to groups.

It is another object of the present invention to provide a method of locating electronic price labels.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
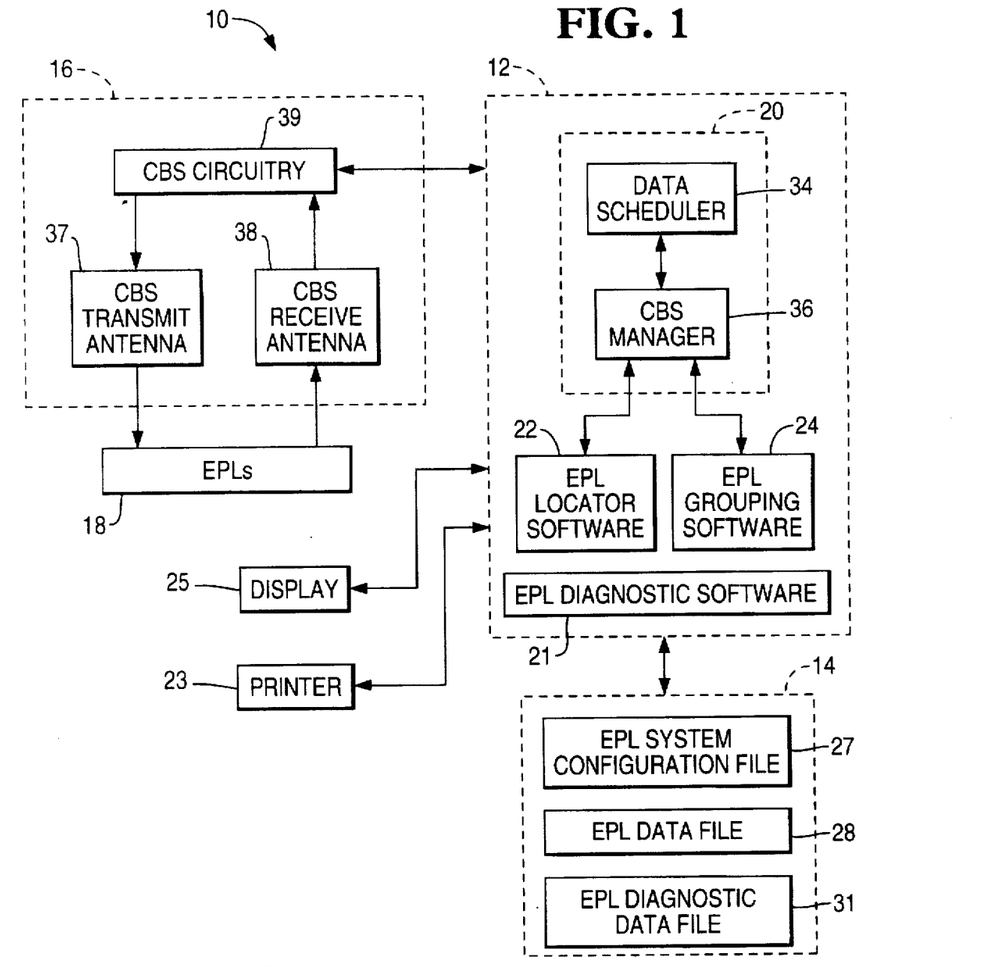
FIG. 1 is a block diagram of an EPL system.

Referring now to FIG. 1, EPL system 10 includes computer 12, storage medium 14, communication base station (CBS) 16a–d, and electronic price labels (EPLs) 18.

Computer 12 executes EPL control software 20, EPL diagnostic software 21, EPL locator software 22, and EPL grouping software 24. EPL control software 20 records, schedules, and transmits all messages to EPLs through CBS 16, and receives and analyzes status messages from EPLs 18 through CBS 16. EPL control software 20 also maintains and uses EPL data file 28, which contains item information, EPL identification information, item price verifier information, and status information for each of EPLs 18.

EPL control software 20 primarily includes data scheduler 34 and CBS manager 36. Data scheduler 34 schedules EPL price change messages to be sent to EPLs 18 through CBS 16.

EPL diagnostic software 21 identifies areas of a transaction establishment that may be causing poor reception of messages by EPLs in the vicinity of these areas. EPL diagnostic software 21 uses EPL location information and EPL group information stored within EPL configuration file 27. EPL diagnostic software 21 stores its results in EPL diagnostic data file 31.

EPL locator software 22 automatically monitors EPL system 10 for received signal strength and determines the location of identified EPLs within groups of EPLs. EPL locator software 22 stores the location information in EPL system configuration file 27. EPL system configuration file 27 tells computer 12 how system 10 is configured, i.e., the addresses of EPL system components and there location within the transaction establishment relative to other components within system 10, and the location of different types of goods in system 10. EPL system configuration file 27 includes a map containing grid coordinates identifying the locations of EPLs 18 and CBSs 16.

EPL grouping software 24 organizes EPLs 18 into groups based upon their abilities to receive messages from CBSs 16. The groups may be based upon the number of message re-transmissions required for different signal strength and noise levels. If EPLs within a group having a high message retry rate are located within the same area of the transaction establishment, that area of the transaction establishment may have a barrier to effective transmission and reception. Upon inspection by personnel, this barrier may be isolated and removed.

Storage medium 14 is preferably a fixed disk drive. Storage medium 14 stores EPL system configuration file 27 and EPL data file 28.

CBS 16 necessarily includes at least one transmit antenna 37 and preferably includes one to four receive antennae 38 for transmitting and receiving messages between CBS 16 and EPLs 18. CBS 16 includes CBS circuitry 39 which controls operation of CBS 16. EPL system 10 preferably includes a plurality of CBSs 16 connected together in series.

CBS manager 36 transmits price change messages to EPLs 18 and receives status messages from EPLs 18 for predetermined time slots.

Figure 2:
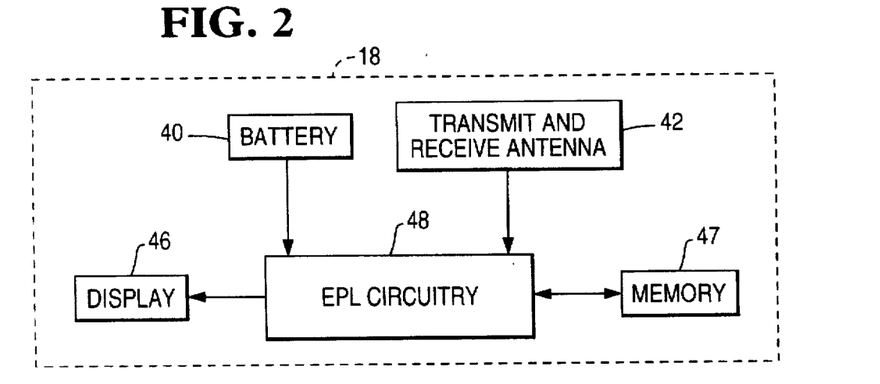
FIG. 2 is a block diagram of an EPL.

Turning now to FIG. 2, EPLs 18 are illustrated.

EPLs 18 each include battery 40, transmit and receive antenna 42, display 46, memory 47, and EPL circuitry 48.

Battery 40 provides power to EPLs 18.

Transmit and receive antenna 42 receives price change and status messages from CBS 16. For EPLs 18 designed for displaying blinking and non-blinking promotional messages, transmit and receive antenna 42 receives promotional messages as well.

Transmit and receive antenna 42 transmits responses to price change and status messages to CBS 16.

Display 46 displays price and possibly additional information. Display 46 is preferably a liquid crystal display (LCD).

Memory 47 stores price verifier information and EPL type information. Preferably, the price verifier information is a checksum of the displayed price. Memory 47 may also store other information, such as promotional information.

EPL circuitry 48 controls the internal operation of EPLs 18.

Figure 3:
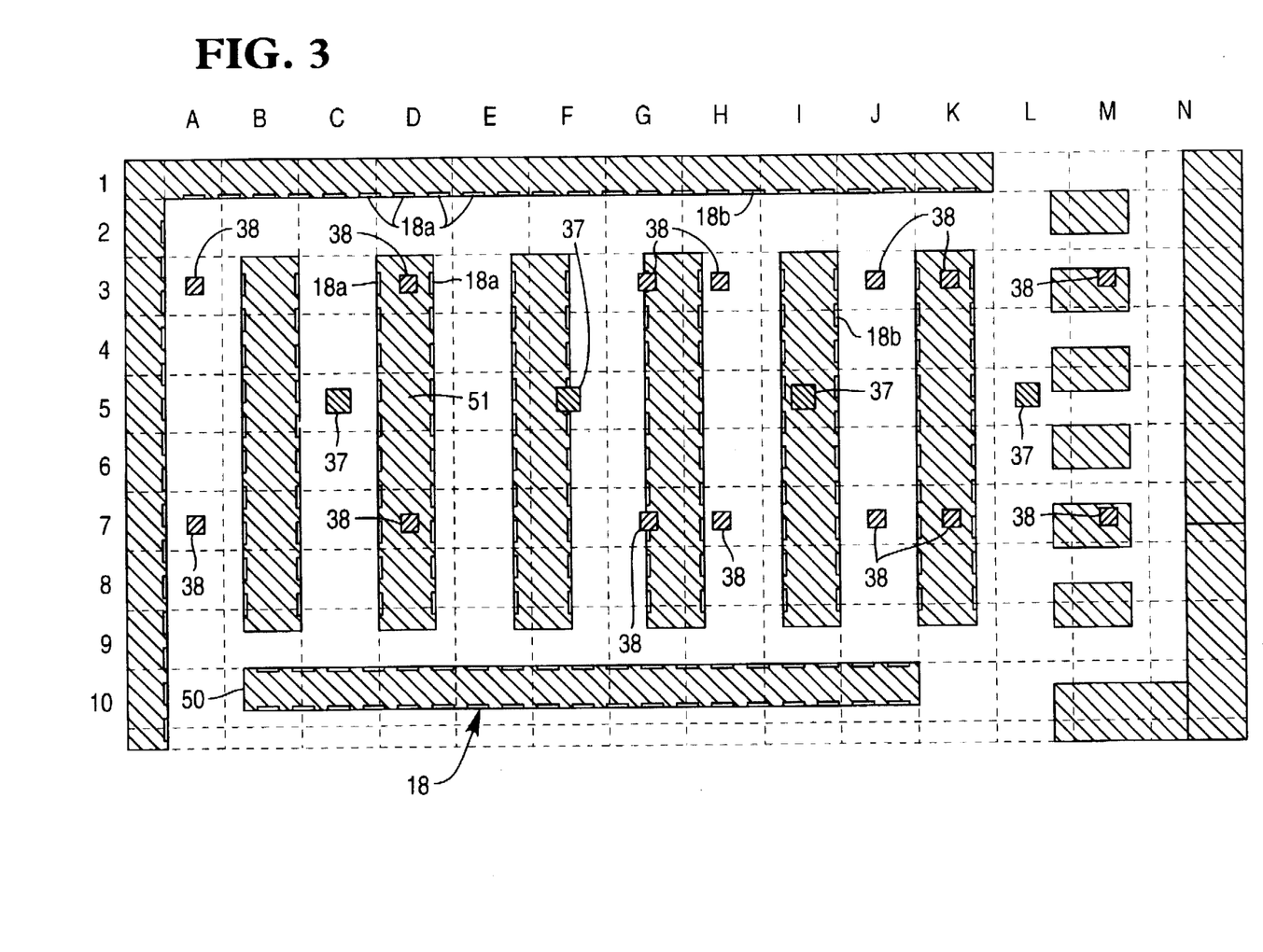
FIG. 3 is a map of a transaction establishment.

Turning now to FIG. 3, a map of a transaction establishment illustrates the location of shelves 50 and a predetermined group of EPLs 18 containing EPLs 18a and 18b. This group may be defined by and contain EPLs having the highest message retry levels. Thus, it would be advantageous to attempt to diagnose the cause.

The locations of EPLs 18a and 18b within the group are determined using EPL locator software 22 and are referenced to a two-dimensional coordinate system in which rows are identified by numerals and columns are identified by letters.

In this example, receive antennae 38 are located at 3A, 7A, 3D, 7D, 3G, 7G, 3H, 7H, 3J, 7J, 3K, 7K, 3M, and 7M. Transmit antennae 37 are located at 5C, 5F, 5I, and 5L.

In this example, EPLs 18a are located in close proximity to each other, while EPLs 18b are scattered throughout the transaction establishment. Looking at the map, a store employee may assume that the high retry level for EPLs 18a in the sub-group are due to a common external cause. Thus, the store employee may look in the vicinity of EPLs 18a and shelf 51 to determine the cause for the high retry level. The store employee may also look at EPLs surrounding EPLs 18a to determine whether retry levels improve with radial distance from the center of the group containing EPLs 18a. For the other EPLs 18b within the group, the store employee may look at adjacent EPLs having different retry levels to determine whether the high retry levels for the EPLs 18b are more likely caused by internal or external problems.

Figure 4:
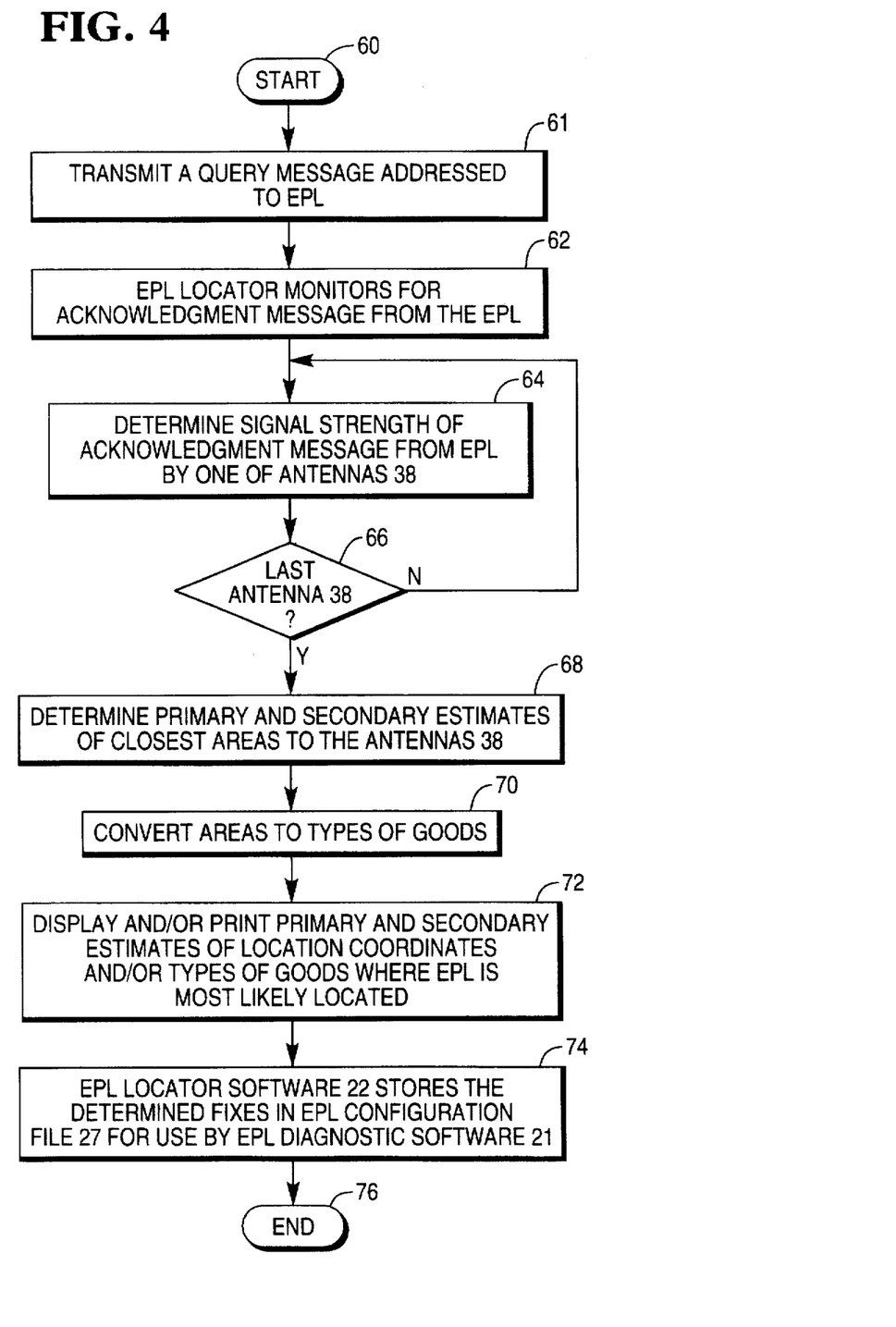
FIG. 4 is a flow diagram illustrating the operation of EPL locator software.

Turning now to FIG. 4, the operation of EPL locator software 22 is explained in more detail, beginning with START 60.

In step 61, EPL control software causes CBSs 16 to transmit a query message to a particular EPL.

In step 62, EPL locator software 22 listens for an acknowledgment message from the EPL.

In step 64, EPL locator software 22 determines the signal strengths and noise levels of any acknowledgment message from the EPL to one of antennae 38 within CBSs 16.

In step 66, EPL locator software 22 determines whether signal strength information for the last of antennae 38 has been determined. If all CBSs 16 have been polled for signal strength information about their antennae 38, the method continues to step 68. If a CBS has not been polled, the method returns to step 64.

In step 68, EPL locator software 22 determines the primary and secondary estimates of fixes from map information stored within EPL configuration file 27. If multiple antennae 38 receive the acknowledgment message, EPL locator software 22 uses basic radar tracking methods to determine the location of the EPL.

In step 70, EPL locator software 22 optionally converts the fixes to types of goods using information in EPL configuration file 27.

In step 72, EPL locator software 22 displays and/or prints primary and secondary estimates of the location coordinates and/or types of goods where the desired EPL is most likely located.

If store personnel determine that the location of the EPL does not correspond to its location in EPL configuration file 27 (e.g., because a child has removed it and placed it somewhere else), they can place the EPL in its proper location.

In step 74, EPL locator software 22 stores the determined fixes in EPL configuration file 27 for use by EPL diagnostic software 21.

In step 76, the method ends.

Figure 5A:
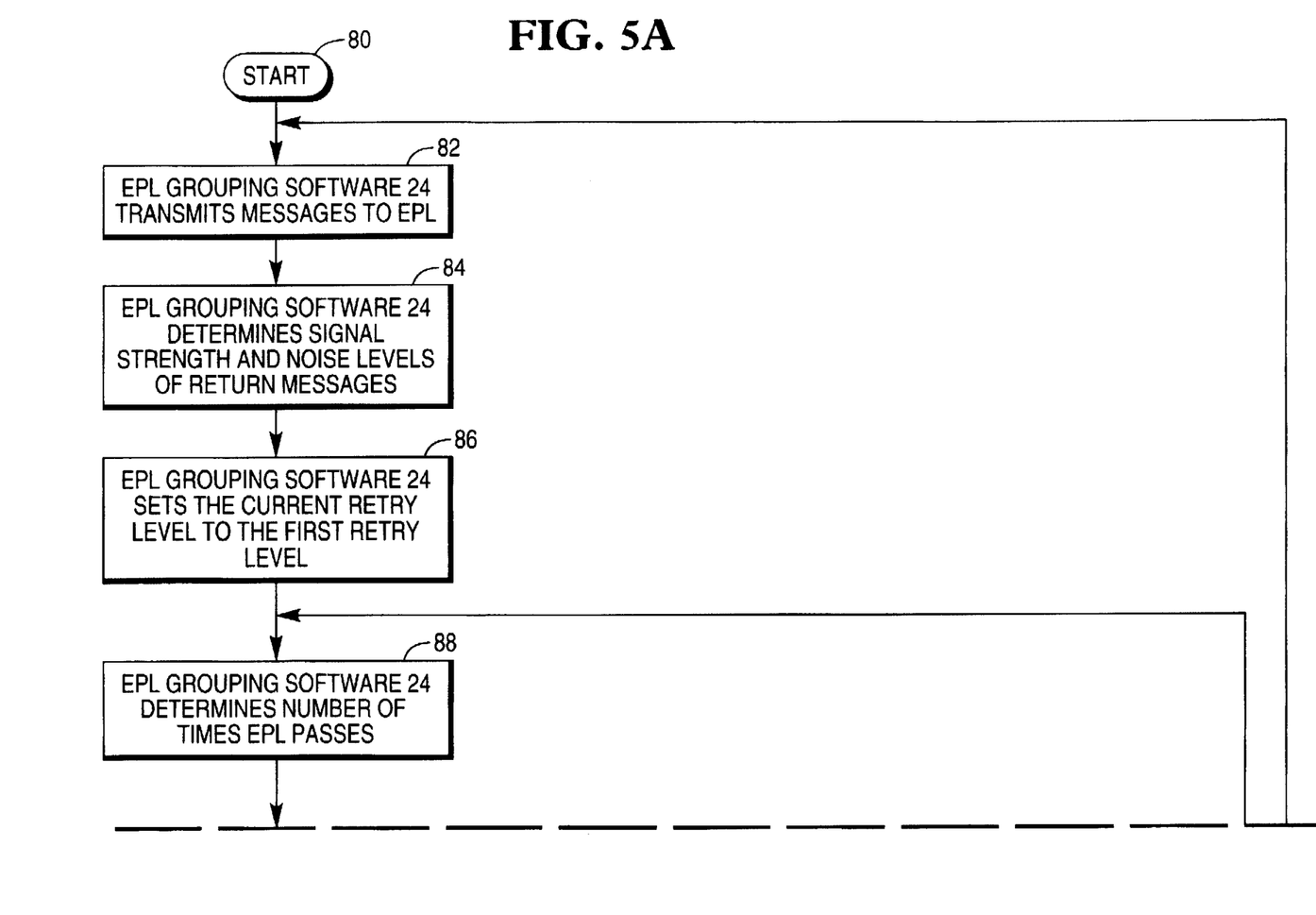
FIGS. 5A and 5B form a flow diagram illustrating a first method of grouping EPLs.
Figure 5B:
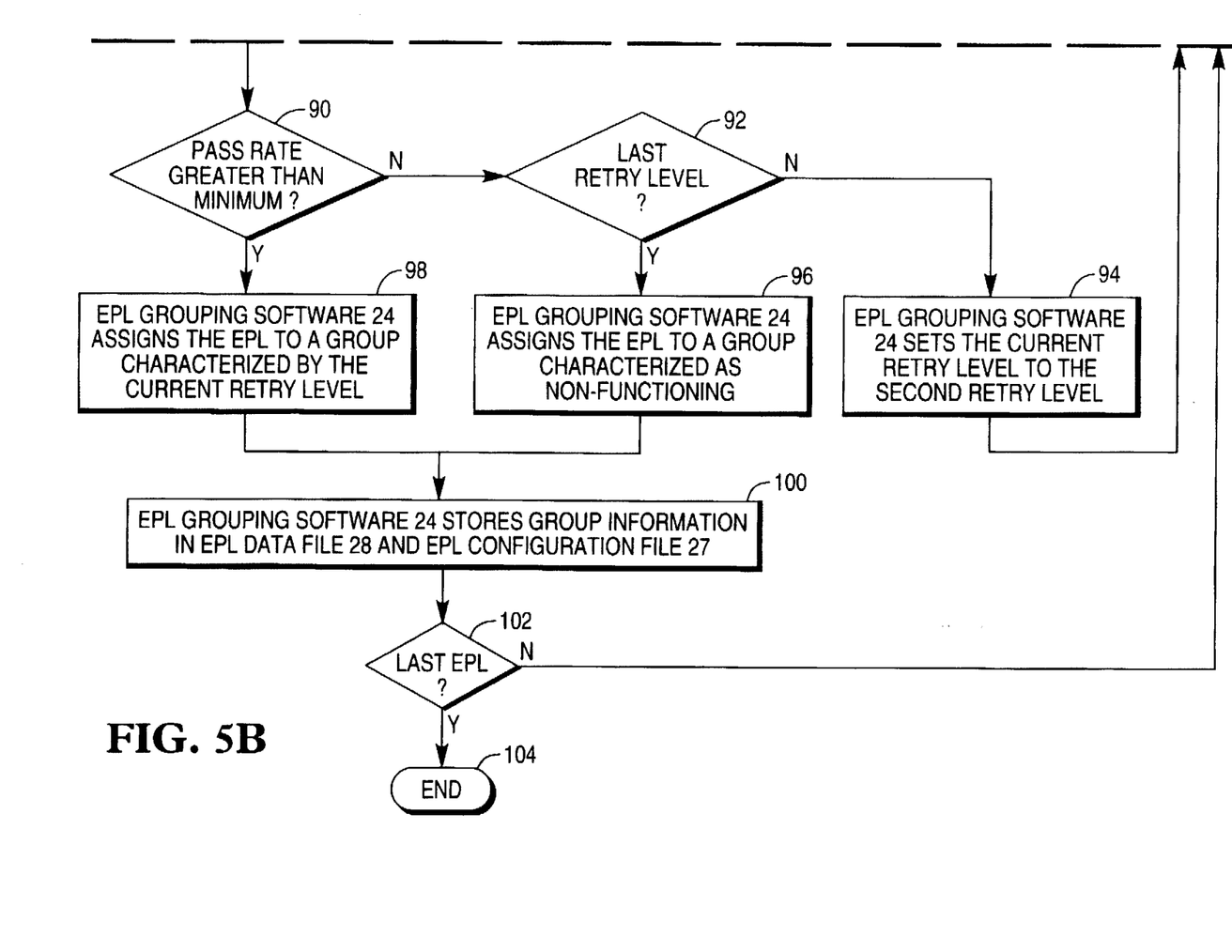

Turning now to FIG. 5, EPL grouping software 24 is explained in more detail, beginning with START 80.

In step 82, EPL grouping software 24 transmits messages to an EPL. EPL grouping software 24 preferably sends 10-200 messages to each EPL.

In step 84, EPL grouping software 24 determines signal strength and noise levels of return messages.

In step 86, EPL grouping software 24 sets the current retry level to the first retry level, which is arbitrarily chosen by the transaction establishment. For example, a message retry of '1' may be the highest and have an associated minimum signal strength of '68' and a maximum noise level of '57'. A message retry of '2' may be the next highest and have an associated minimum signal strength of '64' and a maximum noise level of '58'. Additional retry levels reflecting ever decreasing performance are also preferably determined.

In step 88, EPL grouping software 24 determines how many times the EPL passes the minimum signal-to-noise ratio for the current retry level. In the example provided, after EPL grouping software 24 has received messages from the EPL, EPL grouping software 24 determines the number of times the measured signal strengths and noise levels meet the criteria for a message retry of '1'.

In step 90, EPL grouping software determines whether the pass rate is greater than the minimum for the current level.

EPL grouping software 24 assigns the EPL to a group having a first message retry level of '1' in step 98 if the pass rate is above the predetermined minimum pass rate.

If the pass rate is below the predetermined minimum pass rate, EPL grouping software 24 determines whether the current retry level is the last retry level in step 92. If it is not, then EPL grouping software 24 sets the current retry level to the next retry level in step 94 and returns to step 88 to determine whether the measured signal strengths and noise levels meet the criteria for the next retry level.

Returning to step 92, if the current retry level is the last retry level, then EPL grouping software 24 assigns the EPL to a group characterized as non-functioning in step 96. This group is monitored by employees who replace non-functioning EPLs with new EPLs.

From both steps 96 and 98, EPL grouping software 24 enters the group information in EPL data file 28 and may also enter the group information in EPL configuration file 27 in step 100. The information may be viewed using display 25 or printed using printer 23.

In step 102, EPL grouping software 24 determines whether the current EPL is the last EPL. If it is not, the method returns to step 82 to examine another EPL.

If it is the last EPL, the method ends in step 104.

Figure 6:
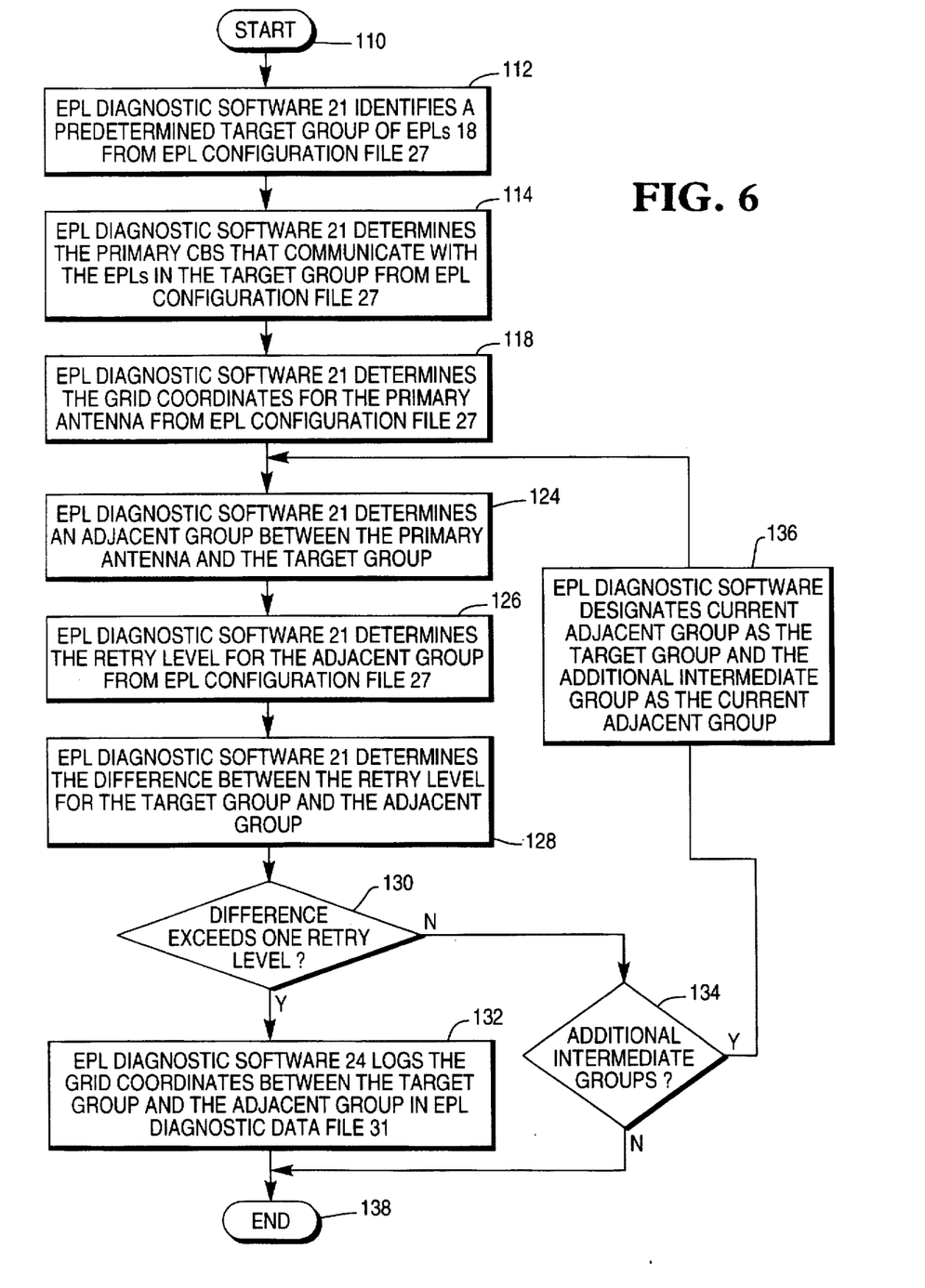
FIG. 6 is a flow diagram illustrating the operation of EPL diagnostic software.

Turning now to FIG. 6, EPL diagnostic software 21 is explained in more detail, beginning with START 110.

In step 112, EPL diagnostic software 21 identifies a predetermined target group of EPLs 18 from EPL configuration file 27. This group may be the one with the highest retry level, although any group having less than optimal retry levels may be chosen. For purposes of this example, the group is assumed to be a single cohesive group, rather than a plurality of subgroups.

In step 114, EPL diagnostic software 21 determines the primary CBS that communicates with the EPLs in the target group from EPL configuration file 27.

In step 118, EPL diagnostic software 21 determines the grid coordinates for the primary antenna of the primary CBS from EPL configuration file 27. For purposes of this example, it is assumed that only one CBS antenna communicates with EPLs in the target group.

In step 124, EPL diagnostic software 21 determines an adjacent group between the primary antenna and the target group.

In step 126, EPL diagnostic software 21 determines the retry levels for the adjacent group from EPL configuration file 27.

In step 128, EPL diagnostic software 21 determines the difference between the retry level for the target group and the retry level for the adjacent group.

In step 130, EPL diagnostic software 21 determines whether the difference exceeds one retry level. If it does, the reception problem is most likely in the vicinity of the target group. EPL diagnostic software 24 logs the grid coordinates between the target group and the adjacent group in EPL diagnostic data file 31 in step 132. The method ends in step 138.

If the difference does not exceed one retry level, EPL diagnostic software 21 determines whether there are any additional groups between the target group and the primary antenna in step 134. If there are not, the method ends in step 138. If none of the differences between intermediate groups exceeds on retry level, then the reception problem is most likely caused by the CBS or by an insufficient number of CBSs.

If there is an additional intermediate group between the target group and the primary antenna, EPL diagnostic software 21 designates the current adjacent group as the target group and the additional intermediate group as the current adjacent group in step 136 and the method returns to step 124.

Thus, the method searches from the original target group to the primary CBS antenna for decreases of at least two retry levels to identify the location of a reception problem. Of course, the method can be extended to search from the target group to other antennae of the CBS and to antennae of other CBSs.

Advantageously, the method of the present invention may be used after EPLs 18 have been installed to tune EPL system 10 for higher reliability and performance.

Figure 7:
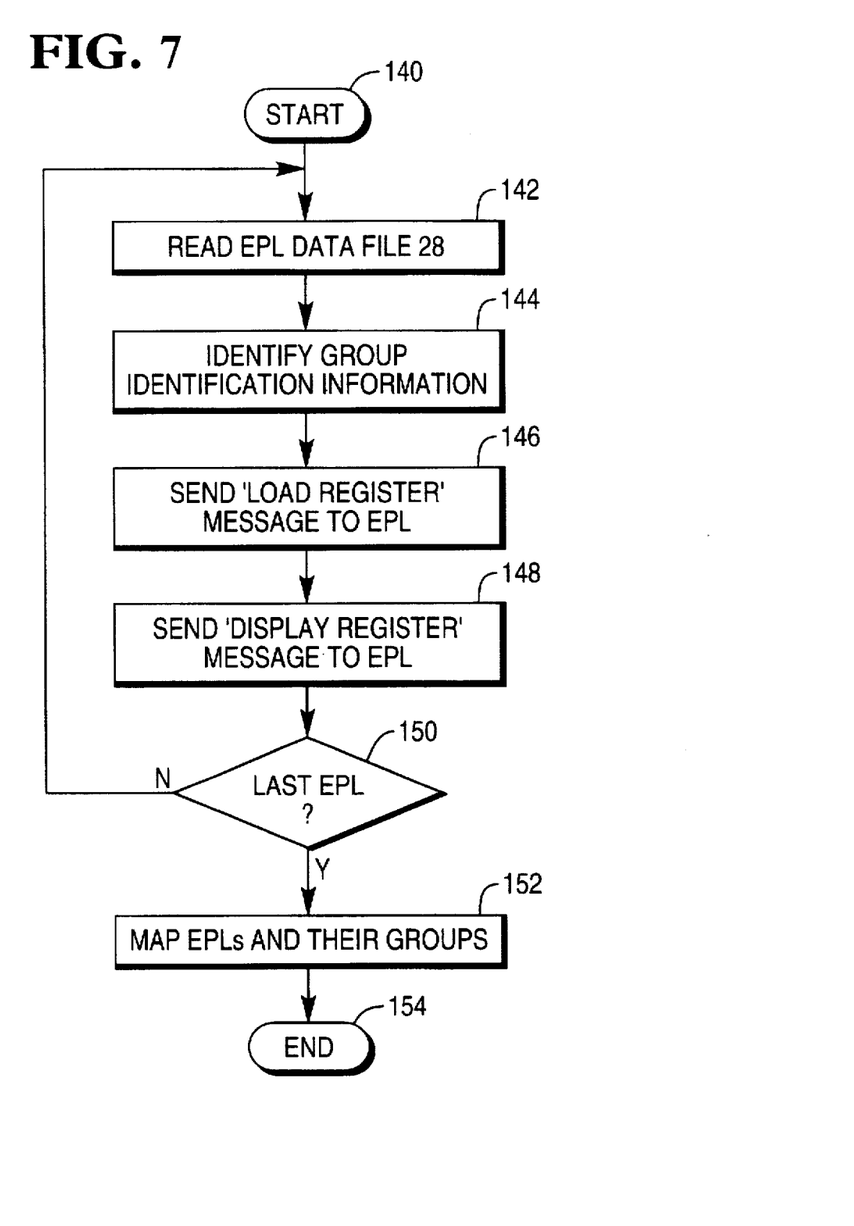
FIG. 7 is a flow diagram illustrating a second method of grouping EPLs.

Turning now to FIG. 7, a second method for assigning EPLs 18 to groups is illustrated, beginning with START 140.

In step 142, EPL locator software 22 reads EPL data file 28.

In step 144, EPL locator software 22 identifies a group associated with a particular EPL. The group identity may be determined from a group number, or by comparing the EPL serial number against a group range of serial numbers, or by comparing an EPL installation date against a range of group dates.

In step 146, EPL locator software 22 instructs the EPL to load its memory 47 with information identifying the group. This display information may be a group number, a blinking group number, a promotional message, or a blinking promotional message.

In step 148, EPL locator software 22 instructs the EPL to display the contents of its memory 47.

In step 150, EPL locator software 22 determines whether it has read information for the last EPL in EPL data file 28. If not, the method returns to step 142. If so, the method proceeds to step 152.

In step 152, EPLs 18 and their groups are mapped to coordinates by employees. The employees view each EPL and log the displayed group number with the EPL's identification number.

In step 154, the method ends.

Although the present invention has been described with particular reference to certain preferred embodiments thereof, variations and modifications of the present invention can be effected within the spirit and scope of the following claims.

What is claimed is:

1. A method of managing groups of electronic price labels in a transaction establishment comprising the steps of:
   (a) assigning the electronic price labels to the groups based upon their ability to receive a message from a computer;
   (b) locating the electronic price labels within the groups;
   (c) mapping locations of the electronic price labels and their groups;
   (d) identifying a predetermined group of electronic price labels having problems receiving messages from a computer; and
   (e) determining the cause of the reception problems using the locations of electronic price labels within the one group.

2. The method as recited in claim 1, wherein step (b) comprises the substeps of:
   (b-1) mapping locations of receiving antennae within the transaction establishment to a map;
   (b-2) transmitting a number of messages to each electronic price label;
   (b-3) transmitting return messages by a number of the electronic price labels;
   (b-4) receiving the return messages by a number of receiving antennae;
   (b-5) determining signal characteristics of the number of return messages at the number of receiving antennae; and
   (b-6) determining locations of the number of electronic price labels relative to the locations of the number of receiving antennae from the map from the signal characteristics.

3. The method as recited in claim 2, wherein substep (b-6) comprises the substeps of:
   (b-6-A) using radar tracking methods to determine a location of one of the electronic price labels if a plurality of receiving antennae receive a return message from the one electronic price label.

4. The method as recited in claim 1, wherein step (b) comprises the substeps of:
   (b-1) transmitting a message to the electronic price labels instructing the electronic price labels to load their memories with information identifying the groups they are in; and
   (b-2) recording a location for each electronic price label and its group.

5. The method as recited in claim 1, wherein step (a) comprises the substeps of:
   (a-1) transmitting a number of messages to each electronic price label;
   (a-2) transmitting return messages by a number of the electronic price labels;
   (a-3) receiving the return messages;
   (a-4) determining a signal characteristic for each of the return messages;
   (a-5) establishing a plurality of groups based upon a plurality of signal characteristic thresholds;
   (a-6) determining a highest signal characteristic threshold for each electronic price label; and
   (a-7) assigning each electronic price label to a group corresponding to its highest signal characteristic threshold.

6. The method as recited in claim 5, wherein substep (a-7) comprises the substeps of:
   (a-7-1) determining a number of times the return messages from an electronic price label exceed a highest signal characteristic threshold;
   (a-7-2) if the number exceeds a predetermined pass rate for the highest signal characteristic threshold, assigning the electronic price label to the group corresponding to the highest signal characteristic threshold;
   (a-7-3) if the number is less than the predetermined pass rate for the highest signal characteristic threshold, determining a number of times the return messages from an electronic price label exceed each signal characteristic threshold below the highest signal characteristic threshold until the number exceeds one of the signal characteristic thresholds below the highest signal characteristic threshold; and
   assigning the electronic price label to the group corresponding to the one signal characteristic threshold.

7. The method as recited in claim 5, wherein the signal characteristic comprises a signal-to-noise ratio.

8. The method as recited in claim 5, wherein step (e) comprises the substeps of:
   (e-1) identifying additional groups of electronic price labels between an antenna and the predetermined group of electronic price labels;
   (e-2) identifying additional signal characteristic thresholds between the additional groups and between a first additional group and the predetermined group;
   (e-3) determining a difference value between the first signal characteristic threshold of the first additional group and the signal characteristic threshold of the predetermined group, and between successive additional groups, until a predetermined threshold difference value is reached;
   (e-4) determining an area including portions of the groups between which the predetermined threshold difference value occurred; and
   (e-5) identifying a communication barrier in the area.

9. The method as recited in claim 1, wherein step (c) comprises the substeps of:
   (c-1) establishing a reference grid on a floor plan of the transaction establishment;
   (c-2) plotting the locations of the electronic price labels on the reference grid.

10. The method as recited in claim 9, wherein the reference grid is two-dimensional and comprises a first plurality of parallel reference lines oriented in a first direction and a second plurality of parallel reference lines oriented in a second direction orthogonal to the first direction.

11. The method as recited in claim 1, wherein step (d) comprises the substeps of:
  (d-1) transmitting a number of messages to each electronic price label;
  (d-2) transmitting return messages by a number of the electronic price labels;
  (d-3) receiving the return messages;
  (d-4) determining a signal characteristic for each of the return messages;
  (d-5) establishing a plurality of groups based upon a plurality of signal characteristic thresholds, wherein a lowest signal characteristic threshold represents a poorest performance; and
  (d-6) identifying a group meeting only the lowest signal characteristic threshold.

12. The method as recited in claim 1, wherein step (e) further comprises the substeps of:
  (e-1) identifying a communication barrier between the predetermined group and an antenna.

13. The method as recited in claim 12, wherein the antenna is a receiving antenna.

14. The method as recited in claim 12, wherein the antenna is a transmitting antenna.

15. A method of assigning electronic price labels to groups comprising the steps of:
  (a) transmitting a number of messages to each electronic price label;
  (b) transmitting return messages by a number of the electronic price labels;
  (c) receiving the return messages;
  (d) determining a signal characteristic for each of the return messages;
  (e) establishing a plurality of groups based upon a plurality of signal characteristic thresholds;
  (f) determining a highest signal characteristic threshold for each electronic price label; and
  (g) assigning each electronic price label to a group corresponding to its highest signal characteristic threshold.

16. The method as recited in claim 15, wherein substep (g) comprises the substeps of:
  (g-1) determining a number of times the return messages from an electronic price label exceeds a highest signal characteristic threshold;
  (g-2) if the number exceeds a predetermined pass rate for the highest signal characteristic threshold, assigning the electronic price label to the group corresponding to the highest signal characteristic threshold;
  (g-3) if the number is less than the predetermined pass rate for the highest signal characteristic threshold,
  determining a number of times the return messages from an electronic price label exceed each signal characteristic threshold below the highest signal characteristic threshold until the number exceeds one of the signal characteristic thresholds below the highest signal characteristic threshold; and
  assigning the electronic price label to the group corresponding to the one signal characteristic threshold.

17. The method as recited in claim 15, wherein the signal characteristic comprises a signal-to-noise ratio.

18. A method of locating one group of electronic price labels out of a number of groups of electronic price labels comprising the substeps of:
  (a) mapping locations of receiving antennae mounted within the transaction establishment to a map;
  (b) assigning the electronic price labels to the groups based upon their ability to receive messages from a computer;
  (c) transmitting a number of the messages to electronic price labels, including a command to load their memories with information identifying the groups they are in;
  (d) transmitting return messages by a number of the electronic price labels within the one group;
  (e) receiving the return messages by a number of the receiving antennae;
  (f) determining signal characteristics of the number of return messages at the number of receiving antennae;
  (g) determining locations of the number of electronic price labels within only the one group relative to the locations of the number of receiving antennae from the map from the signal characteristics; and
  (h) recording a location for each electronic price label in the one group.

19. The method as recited in claim 18, wherein substep (f) comprises the substeps of:
  (g-1) using radar tracking methods to determine a location of one of the electronic price labels if a plurality of receiving antennae receive a return message from the one electronic price label.

20. A method of managing groups of electronic price labels in a transaction establishment comprising the steps of:
  (a) assigning the electronic price labels to the groups based upon their ability to receive a message from a computer, including the substeps of (a-1) transmitting a number of messages to each electronic price label;
  (a-2) transmitting return messages by a number of the electronic price labels;
  (a-3) receiving the return messages;
  (a-4) determining a signal characteristic for each of the return messages;
  (a-5) establishing a plurality of groups based upon a plurality of signal characteristic thresholds;
  (a-6) determining a highest signal characteristic threshold for each electronic price label; and
  (a-7) assigning each electronic price label to a group corresponding to its highest signal characteristic threshold;
  (b) locating the electronic price labels within the groups;
  (c) mapping locations of the electronic price labels and their groups;
  (d) identifying a predetermined group of electronic price labels having problems receiving messages from a computer; and
  (e) determining the cause of the reception problems using the locations of electronic price labels within the one group.

21. The method as recited in claim 20, wherein substep (a-7) comprises the substeps of:
  (a-7-1) determining a number of times the return messages from an electronic price label exceed a highest signal characteristic threshold;
  (a-7-2) if the number exceeds a predetermined pass rate for the highest signal characteristic threshold, assigning the electronic price label to the group corresponding to the highest signal characteristic threshold;
  (a-7-3) if the number is less than the predetermined pass rate for the highest signal characteristic threshold, determining a number of times the return messages from an electronic price label exceed each signal characteristic threshold below the highest signal characteristic threshold until the number exceeds one of the signal characteristic thresholds below the highest signal characteristic threshold; and assigning the electronic price label to the group corresponding to the one signal characteristic threshold.

22. A method of assigning electronic price labels to groups comprising the steps of:

(a) transmitting a number of messages to each electronic price label;

(b) transmitting return messages by a number of the electronic price labels;

(c) receiving the return messages;

(d) determining a signal characteristic for each of the return messages;

(e) establishing a plurality of groups based upon a plurality of signal characteristic thresholds;

(f) determining a highest signal characteristic threshold for each electronic price label; and (g) assigning each electronic price label to a group corresponding to its highest signal characteristic threshold, including the substeps of (g-1) determining a number of times the return messages from each electronic price label exceeds a highest signal characteristic threshold;

(g-2) if the number exceeds a predetermined pass rate for the highest signal characteristic threshold, assigning the electronic price label to the group corresponding to the highest signal characteristic threshold; and (g-3) if the number is less than the predetermined pass rate for the highest signal characteristic threshold, determining a number of times the return messages from an electronic price label exceed each signal characteristic threshold below the highest signal characteristic threshold until the number exceeds one of the signal characteristic thresholds below the highest signal characteristic threshold, and assigning the electronic price label to the group corresponding to the one signal characteristic threshold.

23. A method of diagnosing a reception problem of a target group of electronic price labels (EPLs) comprising the steps of:

determining locations of the EPLs within the target group;

determining a location of an antenna which transmits messages to the EPLs within the target group;

determining whether additional groups exist between the antenna and the target group; and if additional groups exist, determining locations of EPLs within the additional groups;

determining first differences between retry levels of adjacent groups between the target group and the antenna;

determining whether a second difference which exceeds a predetermined number of retry levels exists within the first differences; and if a second difference exists, correlating the second difference with the locations of the EPLs within the groups to determine a location of the reception problem.

24. The method as recited in claim 23, further comprising the steps of:

if a second difference does not exist, servicing transmitter circuitry coupled to the antenna.

* * * * *